(12) United States Patent
Nordh et al.

(10) Patent No.: US 8,324,540 B2
(45) Date of Patent: Dec. 4, 2012

(54) MICROWAVE OVEN SWITCHING BETWEEN PREDEFINED MODES

(75) Inventors: Ulf Erik Nordh, Norrkoping (SE); Olle Sven Niklasson, Finspong (SE); Fredrik Hallgren, Kolmarden (SE); Hakan Kurt Carlsson, Norrkoping (SE)

(73) Assignee: Whirlpool Corporation, Benton Harbor, MI (US)

( * ) Notice: Subject to any disclaimer, the term of this patent is extended or adjusted under 35 U.S.C. 154(b) by 489 days.

(21) Appl. No.: 12/640,052

(22) Filed: Dec. 17, 2009

(65) Prior Publication Data
US 2010/0155392 A1 Jun. 24, 2010

(30) Foreign Application Priority Data
Dec. 19, 2008 (EP) ..................................... 08172376

(51) Int. Cl.
*H05B 6/68* (2006.01)
(52) U.S. Cl. .......................... 219/702; 219/704; 219/745
(58) Field of Classification Search .................. 257/702, 257/704, 745, 747
See application file for complete search history.

(56) References Cited

U.S. PATENT DOCUMENTS

| | | | |
|---|---|---|---|
| 4,340,796 A | * | 7/1982 | Yamaguchi et al. .......... 219/713 |
| 5,521,360 A | * | 5/1996 | Johnson et al. ............... 219/709 |
| 5,632,921 A | | 5/1997 | Risman et al. |
| 6,884,979 B1 | * | 4/2005 | Torngren et al. .............. 219/746 |

FOREIGN PATENT DOCUMENTS

GB 2425415 A 10/2006

\* cited by examiner

*Primary Examiner* — Tom Thomas
*Assistant Examiner* — Christopher M Roland
(74) *Attorney, Agent, or Firm* — Jason S. Burnette

(57) ABSTRACT

A microwave oven and method for heating a load using microwaves are provided. The microwave oven comprises a cavity adapted to receive a load. The cavity is designed to support at least two predefined mode fields. For each predefined mode field, a resonance frequency in the cavity is known. Further, the microwave oven comprises a frequency-controllable microwave source for feeding microwaves into the cavity via at least one feeding port. The method comprises the steps of measuring a signal reflected from the cavity as a function of the operating frequency of the microwave source and identifying resonance frequencies in the cavity based on the measured signal. Further, the method comprises the steps of selecting, for the predefined modes, at least two of the identified resonance frequencies based on the known resonance frequencies and switching the operating frequency of the microwave source using the selected frequencies. The present invention is advantageous in that it enables uniform heating of the load in the cavity.

20 Claims, 12 Drawing Sheets

MICROWAVE OVEN SWITCHING BETWEEN PREDEFINED MODES

BACKGROUND OF THE INVENTION

1. Field of the Invention

The present invention relates to the field of microwave ovens for heating of a load arranged in a cavity and in particular to microwave ovens adapted to switch between mode fields. More specifically, the microwave oven comprises a cavity designed to support at least two predefined modes and a frequency-controllable microwave source connected to the cavity. The microwave oven further comprises a control unit for switching the operating frequency of the microwave source in order to obtain uniform heating.

2. Description of the Related Art

The art of microwave heating involves feeding of microwave radiation in a cavity. When heating a load in the form of food by means of a microwave oven, there are a number of aspects which have to be considered. Most of these aspects are well-known to those skilled in the art and include, for instance, the desire to obtain uniform heating of the food at the same time as a maximum amount of available microwave power is absorbed in the food to achieve a satisfactory degree of efficiency.

As known to a person skilled in the art, uneven heating using microwave radiation may be due to the presence of hot and cold spots in the mode field. Traditional solutions to eliminate, or reduce, the effect of hot and cold spots are the use of a turntable to rotate the load in the cavity of the microwave oven during heating or the use of a so-called "mode stirrer" to continuously alter the mode patterns within the cavity. Drawbacks of such techniques are that they are not fully satisfying in terms of heating uniformity and that they involve rotating or moving parts.

Alternatively, in U.S. Pat. No. 5,632,921, a microwave oven with a quadratic arrangement between a first and a second feed aperture and a phase-shift of ninety degrees between the microwaves input from a first waveguide feed connected to the first feed aperture and a second waveguide feed connected to the second feed aperture is disclosed to produce a rotating microwave pattern in the cavity, thereby producing a more even heating. However, a drawback is that such a microwave oven requires a rather advanced structure for feeding the microwaves to the cavity of the microwave oven and a non-standard design of the cavity.

Thus, there is a need for providing new methods and devices that would overcome these problems.

SUMMARY OF THE INVENTION

An aspect of the present invention provide an improved alternative to the above techniques and prior art.

Generally, it is an aspect of the present invention to provide a microwave oven improving heating uniformity.

This and other aspects of the present invention are achieved by means of a method and a microwave oven having the features defined in the independent claims. Embodiments of the invention are characterized by the dependent claims.

Hence, according to a first aspect of the present invention, a microwave oven as defined in claim 1 is provided. The microwave oven comprises a cavity and a frequency-controllable microwave source. The cavity is adapted to receive a load (object, substance or food) to be heated. The cavity is designed to support at least two predefined modes (or mode fields). For each predefined mode, a resonance frequency in the cavity is known. Further, the microwave oven comprises a frequency-controllable microwave source connected to the cavity for feeding microwaves into the cavity via at least one feeding port. The microwave oven further comprises a measuring unit adapted to measure (or for measuring) a signal reflected from the cavity as a function of the operating frequency of the microwave source (to vary the frequency of the generated microwaves). Further, the microwave oven comprises a control unit connected to the microwave source and adapted to identify resonance frequencies in the cavity based on the measured signal. The control unit is further adapted to select, for the predefined modes, at least two of the identified resonance frequencies based on the known resonance frequencies, and switch the operating frequency of the microwave source using the selected frequencies.

According to a second aspect of the present invention, a method of heating a load using microwaves as defined in claim 14 is provided. The method comprises the step of providing a cavity adapted to receive a load. The cavity is designed to support at least two predefined modes (or mode fields). For each predefined mode, a resonance frequency in the cavity is known. The method further comprises the step of providing a frequency-controllable microwave source for feeding microwaves into the cavity via at least one feeding port. Further, the method comprises the steps of measuring a signal reflected from the cavity as a function of the operating frequency of the microwave source and identifying resonance frequencies in the cavity based on the measured signal. The method further comprises the step of selecting, for the predefined modes, at least two of the identified resonance frequencies based on the known resonance frequencies. The operating frequency of the microwave source is then switched using the selected frequencies.

According to a third aspect of the present invention, there is provided a computer program product, loadable into a microwave oven according to the first aspect of the present invention, comprising software code portions for causing a processing means of the microwave oven to perform steps in accordance with the second aspect of the present invention. In particular, the computer program product is defined for causing the processing means to perform the steps of measuring, identifying, selecting and switching.

The present invention makes use of an understanding that a microwave cavity can be designed to support predefined modes or mode fields that can later be identified during operation of the microwave oven for controlling (switching) the frequency of the microwave radiation source. In particular, the present invention is based on an insight that a frequency-controllable microwave source can be used for switching between two modes or mode fields. The method and microwave oven of the present invention are advantageous in that the operating frequency of the microwave oven are identified and selected rapidly among all the possible reflection minima of the measured signal since the cavity is designed for predefined modes (i.e. known resonance frequencies).

The cavity is designed to support at least two modes or mode fields resulting in complementary heating patterns, thereby providing uniform heating in the cavity. The frequencies used for switching then provide complementary heating patterns such that the presence of hot and cold spots in a first heating pattern (or first mode) is compensated by a second heating pattern (or second mode). In other words, the effect of hot and cold spots in a first mode field, i.e. the presence of hot and cold spots in the cavity, may be eliminated, or at least reduced, by the heating pattern of a second mode field. As a result, the present invention provides a microwave oven with improved heating uniformity.

The switching between the modes may be considered to result in a quasi-rotating mode field in the cavity, in particular if the cavity is designed to support more than two modes.

The control unit is therefore adapted to select frequencies resulting in complementary heating patterns. As a mode may become distorted because of e.g. a change in the load (such as for example a change in geometry, weight or state), the control unit may be adapted to determine which of the resonance frequencies identified in the measured signal and corresponding to a predefined mode may be used for feeding.

This disclosure can be implemented in a microwave oven having a standard design and/or with a standard feeding structure.

This disclosure does not require any moving or rotating part, thereby providing a microwave oven which is mechanically reliable.

Further, this disclosure provides a microwave oven with improved energy efficiency as it operates at frequencies corresponding to reflection minima in the measured signal.

The cavity may be designed such that hot and cold spots in a heating pattern corresponding to a first predefined mode do not correspond to hot and cold spots having the same location in a heating pattern corresponding to a second predefined mode. Hot and cold spots in a first mode field may be directly compensated by cold and hot spots, respectively, in a second mode field. In other words, a cavity location corresponding to a hot or cold spot in a first mode field does not correspond to a hot or cold spot, respectively, in a second mode field. Although the above is described for two mode fields only, this alternately be implemented for more than two mode fields, thereby switching the frequency of the microwave source between more than two values.

Further, for a specific cavity design, a mode may become distorted because of e.g. a change in the load (for example a change in geometry, weight or state). If a change in the load occurs, a predefined mode corresponding to a known resonance frequency may be obtained, in distorted form, at another resonance frequency.

According to an embodiment, the control unit is adapted to select, for a predefined mode, a resonance frequency by comparing the identified resonance frequencies with the known resonance frequency of the predefined mode. Alternatively, the control unit may be adapted to select, for a predefined mode, a resonance frequency by matching the identified resonance frequencies with a frequency interval representative of the known resonance frequency of the predefined mode. If an identified resonance frequency is found to be within a frequency interval representative of a known resonance frequency or predefined mode, the identified resonance frequency is assumed to correspond to the predefined mode. Further, depending on the distortion, the control unit may select whether the identified frequency is to be used for feeding. A significant distortion, e.g. a significant switch in frequency of the reflection minima corresponding to a predefined mode in the measured signal because of a change in the cavity, may indicate that the distorted mode is preferably not to be used for feeding.

The resonance frequencies identified in the reflected signal measured by the measuring unit are the frequencies corresponding to reflection minima in the measured signal. The control unit may be adapted to identify the resonance frequencies whose reflection minima are below a predetermined value such that a limited number of resonance frequencies needs to be analyzed.

According to an embodiment, the frequencies for feeding are selected based upon a predetermined cooking function and/or a predetermined load, which is advantageous in that various cooking functions and/or types of load may require different types of heating, i.e. different types of mode fields. It can be envisaged that, for a certain cooking function, some of the predefined modes are more suitable than other predefined modes. For instance liquid loads (e.g. soup). Frozen load (e.g. meat) and popcorn (susceptor) can each be heated more efficiently by selecting an optimized mode for each load type.

According to yet another embodiment, the microwave oven may further comprise a storage medium for storing the known resonance frequencies and/or the frequency intervals representative of the known resonance frequencies. In particular, the storage medium may be implemented as a look-up table wherein a correspondence is established between the known resonance frequencies and predefined cooking functions or between the known resonance frequencies and predefined loads. Further, the storage medium may also store, for a number of well-known (or typical) loads, complete characteristics of reflection (or reflected signal) as a function of frequency for the particular cavity.

Once the control unit has selected at which frequencies the microwave source is to be operated, an algorithm for switching between the selected frequencies may be implemented. The parameters in the algorithm may depend on a predefined cooking function and/or predefined load. The cooking function or type of load may be a user-defined parameter input by means of e.g. a knob on the microwave oven.

According to an embodiment, the control unit may be adapted to regulate at least one parameter of the group comprising the sequence order of the selected frequencies during an operation cycle, the time of operation at each of the frequencies used for switching and the output power level of the microwave source at each of the frequencies used for switching.

The microwave source may be any frequency-controllable (or frequency agile) microwave source. In particular, the microwave source may be a solid-state based microwave generator comprising semiconductor elements.

Further objectives of, features of, and advantages with, the present invention will become apparent when studying the following detailed disclosure, the drawings and the appended claims. Those skilled in the art will realize that different features of the present invention can be combined to create embodiments other than those described in the following.

BRIEF DESCRIPTION OF THE DRAWINGS

The above, as well as additional aspects, features and advantages of the present invention, will be better understood through the following illustrative and non-limiting detailed description of preferred embodiments of the present invention, with reference to the appended drawings, in which:

FIG. 5b is a schematic two-dimensional (2D) view corresponding to the view shown in FIG. 5a;

FIG. 6b is a schematic 2D view corresponding to the view shown in FIG. 6a;

FIG. 7b is a schematic 2D view corresponding to the view shown in FIG. 7a;

FIG. 8b is a schematic 2D view corresponding to the view shown in FIG. 8a;

All the figures are schematic, not necessarily to scale, and generally only show parts which are necessary in order to elucidate the invention, wherein other parts may be omitted or merely suggested.

DETAILED DESCRIPTION OF THE PREFERRED EMBODIMENTS

Figure 1:
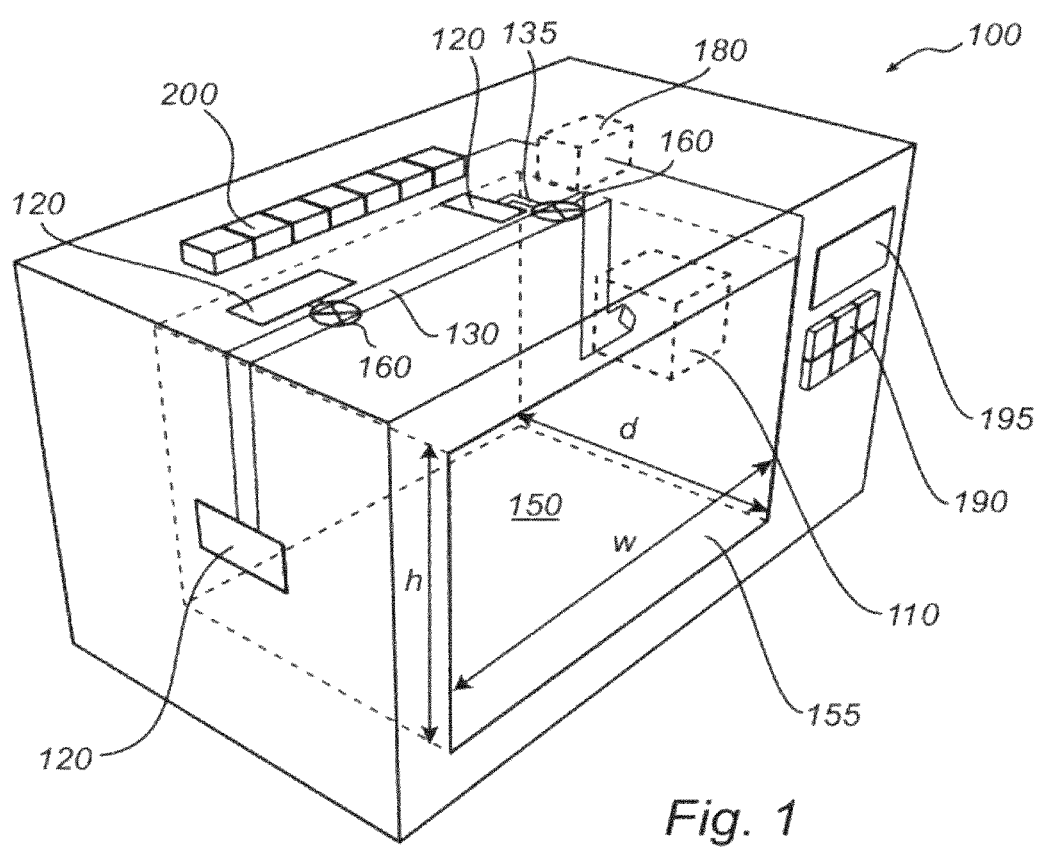
FIG. 1 schematically shows a microwave oven according to an embodiment of the present invention.

With reference to FIG. 1, there is shown a microwave oven 100 having features and functions according to an embodiment of the present invention.

The microwave oven 100 comprises a cavity 150 defined by an enclosing surface. One of the side walls of the cavity 150 may be equipped with a door 155 for enabling the introduction of a load, e.g. food, in the cavity 150. Further, the cavity 150 is provided with at least one feeding port 120 through which microwaves are fed to the cavity 150 of the microwave oven 100. The cavity 150 is generally made of metal.

Although the microwave oven 100 described with reference to FIG. 1 has a rectangular enclosing surface, it will be appreciated that the cavity of the microwave oven is not limited to such a shape and may, for instance, have a circular cross section.

The microwave oven 100 further comprises a frequency-controllable microwave source 110 connected to the feeding port 120 of the cavity 150 by means of a transmission line or waveguide 130. The transmission line may for instance be a coaxial cable.

Although the cavity 150 described with reference to FIG. 1 comprises more than one feeding port (aperture) for transmitting microwaves into the cavity 150, the cavity 150 may be provided with a single feeding port. Further, for guiding the microwaves from the microwave source 110 to the feeding port 120, a feeding structure is provided. The feeding structure may comprise at least one main waveguide or transmission line 130 and, optionally, a plurality of secondary waveguides or transmission lines 135, branching from the main waveguide or transmission line 130, for guiding the microwaves from the microwave source 110 to the feeding port(s) 120.

Further, the microwave oven may comprise switches 160, each being associated with a feeding port 120, arranged in the transmission line 130 for stopping the feeding of a respective feeding port 120.

According to an embodiment, the microwave source 110 is a solid-state based microwave generator comprising, for instance, silicon carbide (SiC) or gallium nitride (GaN) components. Other semiconductor components may also be adapted to constitute the microwave source 110. In addition to the possibility of controlling the frequency of the generated microwaves, the advantages of a solid-state based microwave generator comprise the possibility of controlling the output power level of the generator and an inherent narrow-band feature. The frequencies of the microwaves that are emitted from a solid-state based generator usually constitute a narrow range of frequencies such as 2.4 to 2.5 GHz. However, the present invention is not limited to such a range of frequencies and the solid-state based microwave source 110 could be adapted to emit in a range centered at 915 MHz, for instance 875-955 MHz, or any other suitable range of frequency (or bandwidth). The present invention is for instance applicable for standard sources having mid-band frequencies of 915 MHz, 2450 MHz, 5800 MHz and 22.125 GHz. Alternatively, the microwave source 110 may be a frequency-controllable magnetron such as that disclosed in document GB2425415.

The cavity 150 is designed to support at least two predefined modes or mode fields (called only mode in the following). For each predefined mode, a resonance frequency in the cavity 150 is known. During operation, the known resonance frequencies are used as reference values for determining the frequency of the microwaves transmitted to the cavity 150, i.e. for determining the operating frequency of the microwave source 110.

Figure 2:
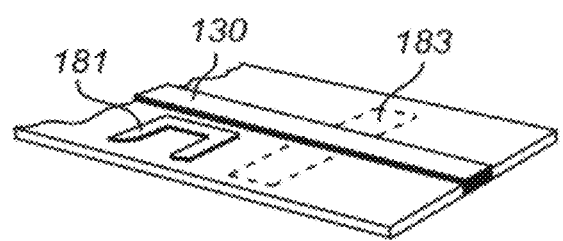
FIG. 2 schematically shows an example of a measuring unit.

Further, the microwave oven 100 comprises a measuring unit (or means) 162 for measuring, or being adapted to measure, a signal reflected from the cavity 150 as a function of the operating frequency of the microwave source 110. Microwaves transmitted to a cavity may be either absorbed by the load, absorbed by elements of the cavity or other objects present in the cavity, or reflected back from the cavity (or feeding port). The reflected signal measured by the measuring unit 162 is representative of the radiation reflected from the cavity 150. For example, the switches 160 may comprise the measuring unit 162 for measuring the microwave power that is reflected from a feeding port 120. The result of such a measurement is then transmitted to a control means or unit 180 (explained in more detail below) which uses the measurements to control the frequency of the microwaves generated by the microwave source 110 (i.e. control the operating frequency of the microwave source 110). Indeed, if the coupling to the cavity 150 is not perfect, some microwave power will be reflected back through the feeding port 120, back into the transmission line 130. An advantageous, and thus preferred, way to control whether there is a satisfactory coupling to the cavity 150, is by measuring the power that is reflected from a feeding port 120, e.g. at a switch 160. It will be appreciated that the level of the signal reflected at the feeding port may depend on the frequency of the transmitted microwaves. FIG. 2 shows a preferred example of how such measuring may be provided in the case with one feeding port 120 which comprises a slot 183 in the ground plane. A directional coupler 181 is arranged adjacent to the transmission line 130 above, which is up-stream of, the slot 183. The directional coupler 181 is in the form of a line that runs parallel to the transmission line 130 across a distance which corresponds to a quarter of the wavelength of the microwaves in the line 130. A potential microwave power that propagates up-stream of the slot 183 will thus be detected via the directional coupler 181 and may subsequently be measured in an already known manner.

Alternatively, or in addition to the above, for direct measurement of the resonance in the cavity, the measuring unit 162 may be a probe comprising a field-sensor at its extremity for sensing the signal reflected from the cavity. Such a probe may suitably be used during the phase for designing the cavity.

The measuring unit 162 may be either integrated as a sub-unit in the control unit 180 or arranged as a separate unit connected to the control unit 180.

Further, the microwave oven 100 comprises a control unit 180 for controlling the microwave source 110 and, thereby, the properties (such as frequency and power) of the microwaves transmitted into the cavity 150. The control unit 180 is connected to the microwave source 110 and the measuring unit 162 such that the microwave source 110 sweeps its frequency across the allowable bandwidth and the measuring unit 162 measures the signal reflected from the cavity 150. The control unit 180 is adapted to identify resonance frequencies in the cavity 150 based on the signal measured by the measuring unit 162. In this respect, the identified resonance frequencies are the frequencies corresponding to reflection minima in the measured signal. In particular, the control unit 180 may be adapted to identify the resonance frequencies whose reflection minima are below a predetermined value (or threshold). The use of a threshold is advantageous in that the control unit 180 takes away some of the reflection minima, thereby reducing the number of reflection minima to be further analyzed.

The control unit 180 is further adapted to select, for the predefined modes of the cavity 150, at least two of the identified resonance frequencies based on the known resonance frequencies. For example, the control unit 180 may be adapted to select, for each one of the predefined modes of the cavity 150, at least one of the identified resonance frequencies based on the known resonance frequencies.

In a first alternative, the control unit 180 may be adapted to select frequency by comparing the identified resonance frequencies with the known resonance frequency of a predefined mode. If an identified resonance frequency corresponds to one of the known resonance frequencies, one of the predefined modes, i.e. the mode corresponding to the known resonance frequency, may be obtained at the identified resonance frequency. However, if the known resonance frequencies for the predefined modes have been determined with an empty cavity, there may be a mismatch between the values of the known resonance frequencies and the values of the identified frequencies because the presence of a load in the cavity may cause a distortion of the mode pattern. Further, the reflected signal as a function of frequency may also depend on the state (or conditions) of the load, i.e. the reflection minima are not observed at the same frequency if a change occurs in the load. Thus, for a specific predefined mode, there may be some discrepancy (mismatch) between the identified resonance frequency and the known resonance frequency. The resulting predefined mode observed at the identified resonance frequency is distorted (distorted mode).

In a second alternative, the control unit 180 may be adapted to select, for a predefined mode, a frequency by matching an identified resonance frequency with a frequency interval representative of a known resonance frequency of the predefined mode. As an example, if a cavity has been designed to support a mode at a known resonance frequency of 2460 GHz when the cavity is empty, a resonance frequency identified at e.g. 2459 GHz for the same cavity with a load arranged in the cavity most probably correspond to the same mode, but somewhat distorted. Similarly, if a cavity has been designed to support a mode at a known frequency of 2460 GHz with a typical load arranged in the cavity, a resonance frequency at e.g. 2459 GHz for the same cavity and the same load in a different state could correspond to the same mode, but distorted. The distortion and the effect of a change in the load will be further exemplified in the following in connection to FIGS. 10-15. Thus, for a cavity designed to support a mode at a known resonance frequency of 2460 GHz, the control unit may be adapted to search for a resonance frequency within the frequency interval 2455-2465 GHz in the reflected signal measured by the measuring unit 162.

The control unit 180 is further adapted to switch the operating frequency of the microwave source 110 using the selected frequencies. Thus, during an operation cycle divided in a plurality of time portions, the frequency of the microwaves transmitted to the cavity 150 may be varied from one portion to another. According to an embodiment, the control unit 180 is adapted to select the frequencies based upon a predetermined cooking function and/or a predetermined load. For this purpose, the microwave oven 100 may be provided with usual push buttons and knobs, as denoted by 190 in FIG. 1, for setting operation parameters such as cooking function and type of load, as well as a display 195. The control unit 180 is advantageously adapted to switch between selected frequencies resulting in complementary heating patterns.

The cavity is designed to support a limited number of modes such that the resonance frequencies in the cavity, or reflection minima in the reflected signal, are well-separated. A sufficient separation in frequency is advantageous since it facilitates the identification of the resonance frequencies, or modes, in the measured signal. Normally, if the size (i.e. the dimensions) of the cavity increases, the separation in frequency between the reflection minima decreases. At some point, i.e. for a cavity having a relatively large size, the reflection minima are so close that they merge and identification of resonance frequencies in the measured signal becomes difficult. The present invention is therefore preferably applicable for cavities of small size, e.g. in the order of the size of a standard lunch box with a typical load in the range of 350 g. However, the present invention is applicable for microwave ovens comprising a cavity designed to support any number of mode fields. Two examples of cavity sizes will be presented in the following in connection to FIGS. 4-8 and 9-15. Generally, the present invention is applicable for microwave oven comprising a cavity designed to support at least two predefined mode fields.

The number and/or type of available mode fields in the cavity 150 are determined by the design of the cavity 150. The design of the cavity 150 comprises the physical dimensions of the cavity 150 and the location of the feeding port 120 in the cavity 150. The dimensions of the cavity 150 are generally denoted by the reference signs h, d and w for the height, depth and width, respectively, in the figures provided with a coordinate system (x, y, z). The cavity is designed such that it supports at least two modes (i.e. not too small) and such that the total number of mode fields is limited for ensuing a sufficient separation in frequency between the modes (i.e., for avoiding, or at least minimizing, that reflection minima between different modes merge).

The feeding port 120 may be arranged at, in principle, any walls of the cavity 150. However, there is generally an optimized location of the feeding port for a predefined mode. For examples, the feeding port 120 may be located a side wall or the top wall of the cavity 150 such as shown in FIG. 1. Further, it may be envisaged to implement the present invention using more than one feeding port. In such a configuration, microwaves at a first frequency can be fed into the cavity 150 using a first feeding port while microwaves at a second frequency can be fed into the cavity 150 using a second feeding port. The selection of a feeding port for a specific frequency may also be selected depending on the resulting heating pattern.

Normally, the reflected signal is measured by the measuring unit 162 at the beginning of an operation cycle and the frequencies used for switching are selected in accordance with the above. However, it can also be envisaged that the measuring unit 162 is adapted to, continuously or periodically, monitor the signal reflected from the cavity 150 to dynamically (i.e., during an operation cycle) select the frequencies used for switching. The measuring unit 162 may be adapted to measure the signal reflected from the cavity 150 after a pulse is sent by the microwave source 110. For the synchronization of the measurements in relation to, or within, the operation cycle, the microwave oven may further comprise a clock system.

Figure 3:
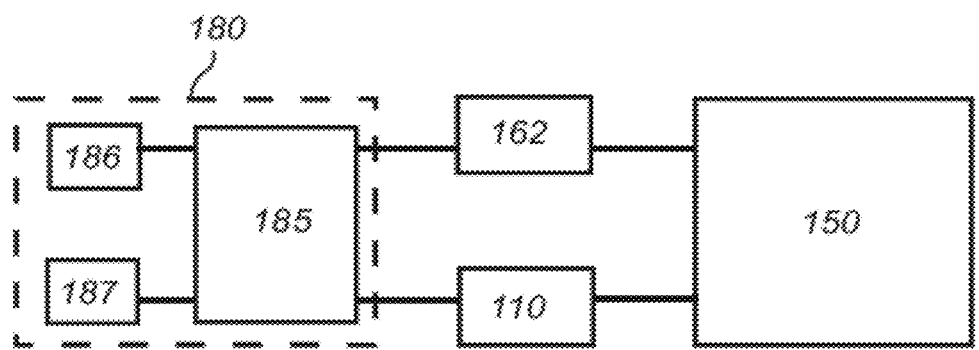
FIG. 3 shows a block diagram illustrating the general functions of the microwave oven according to an embodiment of the present invention.

The general function of the microwave oven of the present invention is further illustrated in FIG. 3 in the form of a block diagram. The generator 110 feeds microwaves to the cavity 150. The signal reflected from the cavity 150 is measured by the measuring unit 162 and the measured signal is transmitted to the control unit 180. The control unit 180 may comprise a processor 185 for analyzing the measured signal and extract (or identify) the resonance frequencies corresponding to reflection minima. The control unit 180 further comprises a storage medium 186 for storing the known resonance frequencies which can be used by the processor 180 to select, among the extracted or identified resonance frequencies, two or more frequencies for controlling the microwave source 110. As pointed out above, the present invention is based on an understanding of how to select the frequencies among the plurality of frequencies corresponding to reflection minima in the measured signal. The operating frequency of the microwave source 110 can then be regulated in accordance with an algorithm wherein the microwave source 110 operates at a first frequency F1 for a first portion of time T1 and at a second frequency F2 for a second portion of time T2 during an operation cycle. In addition to the measured reflection, the optimization of the parameters of the algorithm may depend on parameters indicated by a user. As mentioned above, the control unit 180 may also comprise a clock system 187.

Design of the cavity 150 allowing a limited number of modes will now be described in the following.

The calculation of the dimensions of the cavity is based on the formula for modal resonance frequencies, equation 1, in an air-filled cavity:

$$f = \frac{c}{2} \cdot \sqrt{\left(\frac{n}{w}\right)^2 + \left(\frac{m}{d}\right)^2 + \left(\frac{p}{h}\right)^2}. \quad \text{(Equation 1)}$$

Where n is the mode index in the width dimension, m is the mode index in the depth dimension, p is the mode index in the height dimension, w is the cavity width, d is the cavity depth, h is the cavity height along direction x, y and z, respectively, in a (x, y z) coordinate system as shown in, e.g., FIG. 1, and c is the speed of light in vacuum. A mode index represents the number of half wavelengths in a dimension of the cavity.

For the design of a cavity supporting at least two predefined modes, i.e. a cavity having two known resonance frequencies, a value is assigned to one of the cavity dimensions. In the present example, a value of 0.280 m is assigned to the width w. The cavity is chosen to support a first mode at a first frequency of 2.410 GHz and a second mode at a second frequency of 2.485 GHz. The two selected frequencies are also refer to as the first and second known frequencies. It will be appreciated that the values of the width w and the resonance frequencies used in the present embodiment are only examples of many possible values and that other values may be used within the scope of the present invention.

Generally, the frequencies are selected within the allowed frequency bandwidth, in the present case between 2.4 and 2.5 GHz. The frequencies are preferably selected with a sufficient separation such that the reflection minima do not merge. In other words, the frequencies are preferably selected such that the reflection minima remain separated and identifiable although the modes corresponding to these frequencies may become distorted. The effect of distortion will be further explained in connection to FIGS. 10-15. Further, the separation between the two selected frequencies is limited such that, in the present of a load or in case of a change in the cavity or the load arranged in the cavity, the reflection minima are still comprised within the allowed frequency bandwidth. If the two frequencies were selected to be too close to the boundaries (e.g., 2.4 and 2.5 GHz) of the allowed bandwidth, there may be a risk that the corresponding modes, in the presence of a load in the cavity, would be identified at reflection minima corresponding to frequencies outside the allowed bandwidth (e.g., below 2.4 GHz).

The speed of light in vacuum is considered to be equal to 299792458 m/s. The mode indices of interest for the two predefined modes are also selected. In the present example, the first mode is selected to be a $TM_{411}$ mode and the second mode is selected to be a $TM_{312}$ mode. The two modes may also be defined as mode 1 and mode 2, respectively, having the following values for indexes n(width), m(depth) and p(height):

Mode 1 (for the first frequency): $n_1=4$; $m_1=1$; $p_1=1$; and

Mode 2 (for the second frequency): $n_2=3$; $m_2=1$; $p_2=2$.

The cavity height may then be calculated according to Equation 2:

$$z = \sqrt{\frac{(m_1 \times p_2)^2 - (m_2 \times p_1)^2}{\left(\frac{2 \times m_1 \times f_2}{c}\right)^2 - \left(\frac{m_1 \times n_2}{w}\right)^2 - \left(\frac{2 \times m_2 \times f_1}{c}\right)^2 + \left(\frac{m_2 \times n_1}{w}\right)^2}}$$ (Equation 2)

In the present example, the cavity height is then equal to 0.169 m.

The cavity depth may then be calculated according to Equation 3:

$$y = \frac{(m_2)}{\sqrt{\left(\frac{2 \times f_2}{c}\right)^2 - \left(\frac{n_2}{w}\right)^2 - \left[\frac{p_2}{\sqrt{\frac{(m_1 \times p_2)^2 - (m_2 \times p_1)^2}{\left(\frac{2 \times m_1 \times f_2}{c}\right)^2 - \left(\frac{m_1 \times n_2}{w}\right)^2 - \left(\frac{2 \times m_2 \times f_1}{c}\right)^2 + \left(\frac{m_2 \times n_1}{w}\right)^2}}}\right]^2}}$$ (Equation 3)

In the present example, the cavity depth is then equal to 0.228 m.

Although the above example is based on a cavity having a rectangular enclosing surface defined by Cartesian coordinates, it will be appreciated that the condition of resonance may also be applied for an enclosing surface defined by cylindrical or spherical coordinates.

Further, the following condition for design of a cavity has been empirically observed:

$$(m_1 \times p_2)^2 > (m_2 \times p_1)^2$$ (Equation 4).

With reference to FIGS. 4-8, results of simulation tests performed in a cavity having the above design (or dimensions) are described. The cavity 150 is considered to be an empty air-filled cavity with a rectangular geometry having a width of 280 mm, a depth of 228 mm and a height of 169 mm. The cavity theoretically has resonances at least for the $TM_{411}$ mode at 2410 MHz and the $TM_{312}$ mode at 2485 MHz. In the present embodiment, the microwave source 110 is considered to be an ideal point-like source (i.e., the location of the feeding port 120 is not of importance in the present example). When the point-like (lumped) source is driving a resonance in the cavity, the current drawn from the source is minimal FIG. 4a illustrates a graph of the signal reflected from the cavity as a function of the frequency obtained by numerical investigation using the so called Finite Difference probing. FIG. 4a shows that resonances very close to the known resonance frequencies for the predefined modes are obtained, namely a resonance at a frequency of 2408.5 MHz (first reflection minima $R_{min1}$ in the graph) and at a frequency of 2481.3 MHz (third reflection minima $R_{min3}$ in the graph). In addition, a resonance is also observed at a frequency of 2412.7 MHz (second reflection minima $R_{min2}$ in the graph). Thus, in the present example, the control unit will switch the frequency of the microwaves between the frequency corresponding to $R_{min1}$ and $R_{min3}$ as these correspond to the two predefined modes.

FIGS. 5-8 illustrate the field patterns when the cavity as designed in accordance to the above is excited using a sinusoidal waveform at the frequencies of 2408.5 MHz and 2481.3 MHz.

Figure 5A:
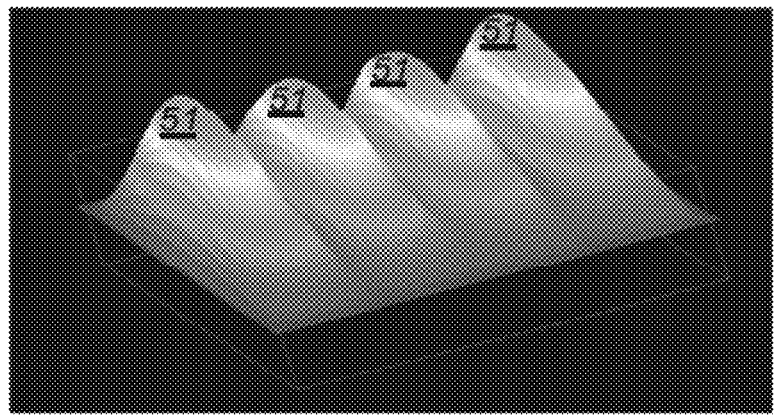
FIG. 5a is a schematic three-dimensional (3D) view in a horizontal cross-section of a cavity, without a load, the cavity having the dimensions 280×228×169 mm, for the mode $TM_{411}$ excited with a frequency of 2408.5 MHz.
Figure 5B:
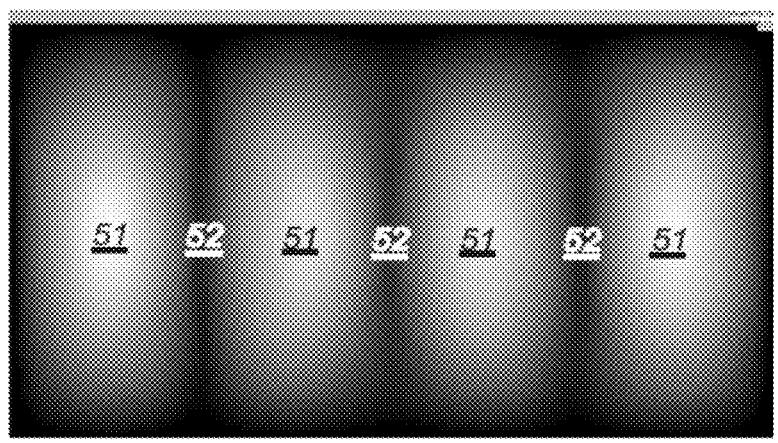

FIGS. 5a and 5b show the field pattern (vertical electric field) in a horizontal cross-section of the cavity of a microwave oven, the cavity having the dimensions 280×228×169 mm, for the mode $TM_{411}$ excited with a frequency of 2408.5 MHz. FIG. 5a shows a three-dimensional (3D) view of the field pattern in the cavity while FIG. 5b shows a two-dimensional (2D) view of the same field pattern in a (x, y) plane. In the figures, the amplitude of the vertical electric field is shown for the mode $TM_{411}$, which is generated in the cavity. Areas having a large amplitude 51 are substantially symmetrically distributed in the x-direction, separated by areas having a small amplitude 52. Between these areas 51, 52 the amplitude varies continuously. It will be appreciated that the mode $TM_{411}$ exhibits four maxima of the electric field in the x-direction.

Figure 6A:
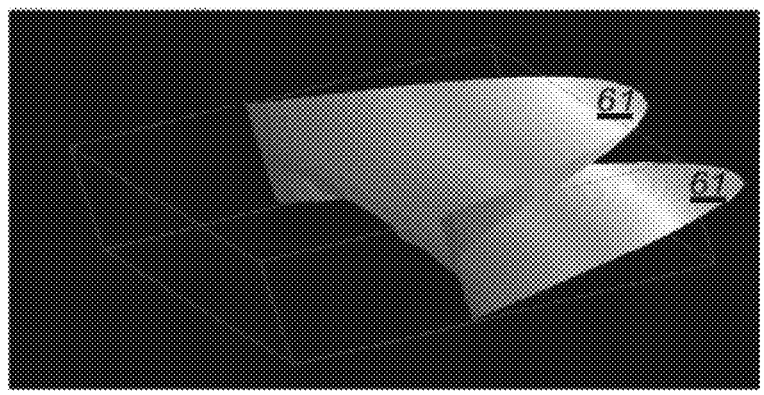
FIG. 6a is a schematic 3D view in a vertical cross-section of the cavity shown in FIG. 5a for the mode $TM_{411}$ excited with a frequency of 2408.5 MHz.
Figure 6B:
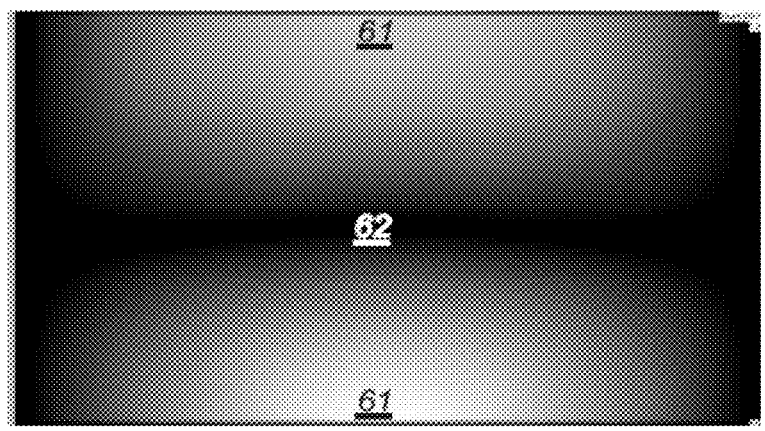

FIGS. 6a and 6b show, for the same cavity as described in the above, the field pattern (vertical electric field) in a vertical cross-section of the cavity for the mode $TM_{411}$ excited with a frequency of 2408.5 MHz. FIG. 6a shows a 3D view of the field pattern in the cavity while FIG. 6b shows a 2D view of the same field pattern in a (y, z) plane. Areas having a large amplitude 61 are substantially symmetrically distributed in the z-direction, separated by areas having a small amplitude 62. Between these areas 61, 62 the amplitude varies continuously. It will be appreciated that the mode $TM_{411}$ exhibits two maxima of the electric field in the z-direction.

Figure 7A:
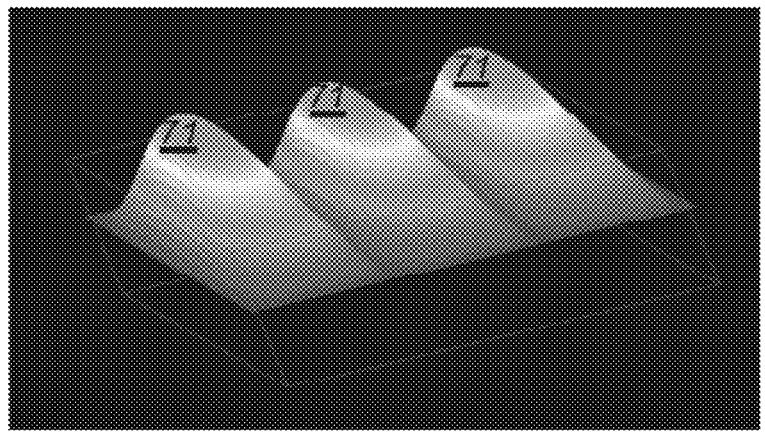
FIG. 7a is a schematic 3D view in a horizontal cross-section of the cavity shown in FIG. 5a for the mode $TM_{312}$ excited with a frequency of 2481.3 MHz.
Figure 7B:
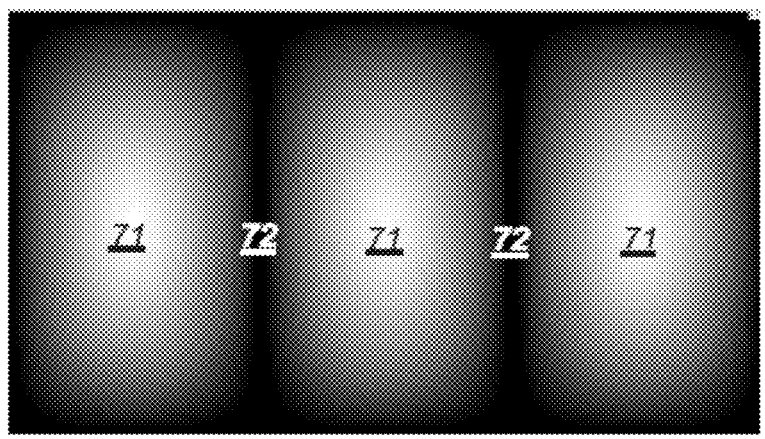

FIGS. 7a and 7b show, for the same cavity as described in the above, the field pattern (vertical electric field) in a horizontal cross-section of the cavity for the mode $TM_{312}$ excited with a frequency of 2481.3 MHz. FIG. 7a shows a 3D view of the field pattern in the cavity while FIG. 7b shows a 2D view of the same field pattern in a (x, y) plane. Areas having a large amplitude 71 are substantially symmetrically distributed in the z-direction, separated by areas having a small amplitude 72. Between these areas 71, 72 the amplitude varies continuously. It will be appreciated that the mode $TM_{312}$ exhibits three maxima of the electric field in the x-direction.

Figure 8A:
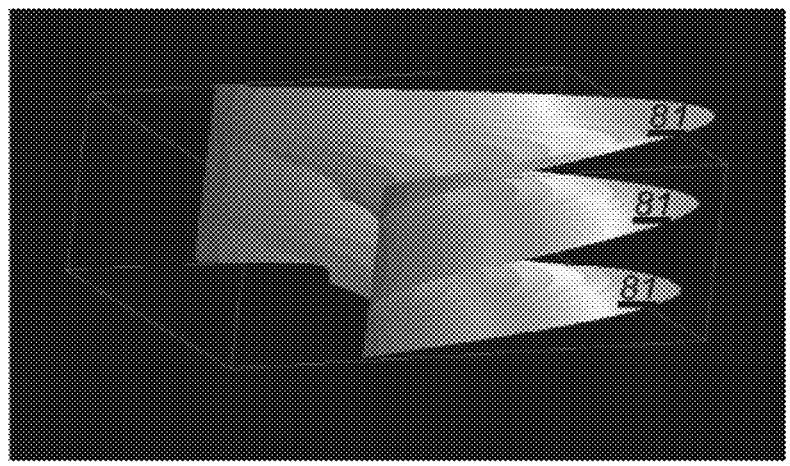
FIG. 8a is a schematic 3D view in a vertical cross-section of the cavity shown in FIG. 5a for the mode $TM_{312}$ excited with a frequency of 2481.3 MHz.
Figure 8B:
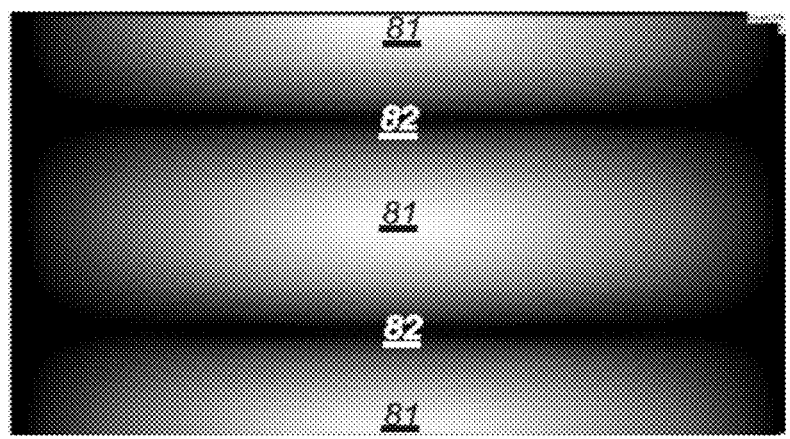

FIGS. 8a and 8b show, for the same cavity as described in the above, the field pattern (vertical electric field) in a vertical cross-section of the cavity for the mode $TM_{312}$ excited with a frequency of 2481.3 MHz. FIG. 8a shows a 3D view of the field pattern in the cavity while FIG. 8b shows a 2D view of the same field pattern in a (y, z) plane. Areas having a large amplitude 81 are substantially symmetrically distributed in the z-direction, separated by areas having a small amplitude 82. Between these areas 81, 82 the amplitude varies continuously. It will be appreciated that the mode $TM_{312}$ exhibits three maxima of the electric field in the z-direction.

The field patterns shown in FIGS. 5-8 clearly illustrate that the cavity having the above-described design (dimensions 280×228×169 mm) and predefined modes ($TM_{312}$ at about 2480 MHz and $TM_{411}$ at about 2410 MHz) provides complementary heating patterns, thereby resulting in uniform heating. The cavity has been designed in such a manner that cold spots or cold areas in the first mode (e.g. areas 52 and 62) correspond to warm spots in the second mode (e.g. areas 71 and 81) and vice versa.

Referring again to FIG. 1, for e.g. testing a newly designed cavity, the microwave oven may further comprise a row of IR sensors 200 for measuring the temperature distribution of a load placed in the cavity.

With reference to FIGS. 9-15, another embodiment of the present invention is presented.

Figure 9:
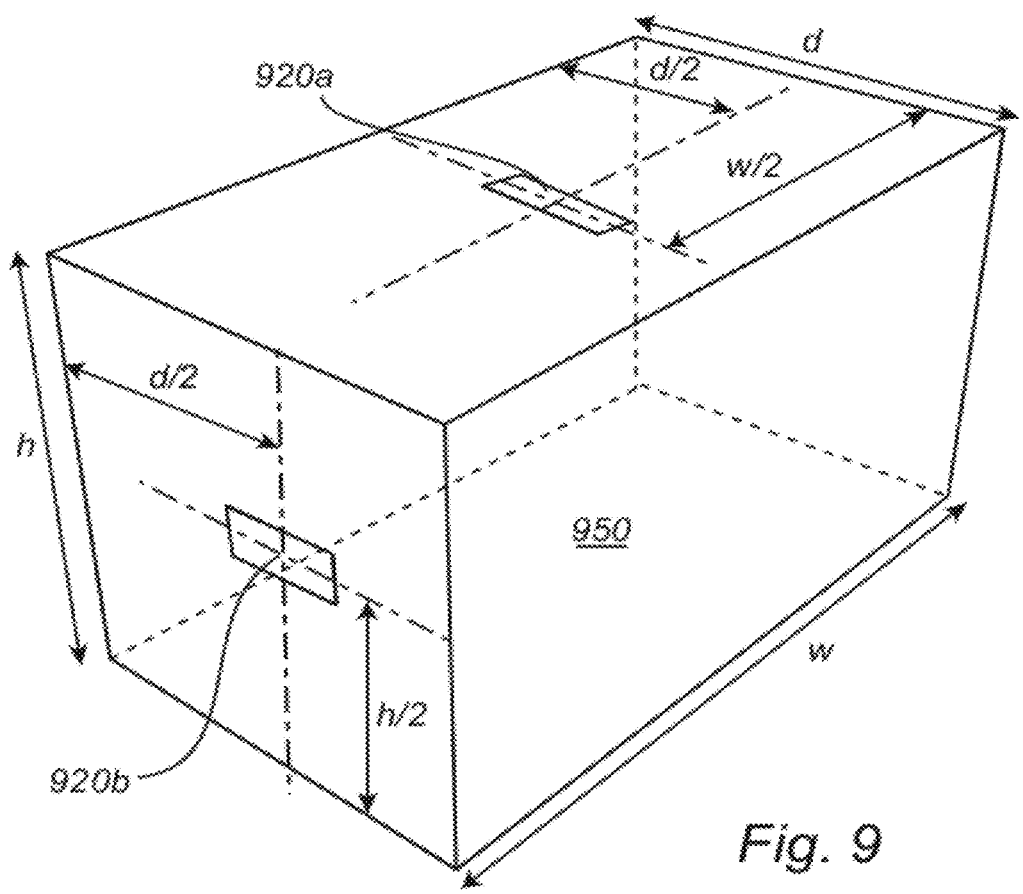
FIG. 9 schematically shows a cavity of a microwave oven according to another embodiment of the present invention.

FIG. 9 shows a cavity 950 that has been designed using the method described above with reference to Equations 1-4. In the present embodiment, the cavity 950 has a width w of 280 mm, a depth d of 214 mm and a height h of 175 mm. The cavity is provided with two separate apertures or feeding ports for feeding microwaves into the cavity. The cavity is designed to support a first mode $TM_{411}$ at a first frequency close to 2410 MHz and a second mode $TM_{312}$ at a second frequency close to 2450 MHz. A first feeding port 920a or ceiling waveguide (z=h) is placed on the enclosing surface at half width (x=w/2) and half depth (y=d/2), while a second feeding port 920b is placed on the enclosing surface at a side wall (left-hand side when opening the door of the cavity, x=0) at half height (z=h/2) and half depth (y=d/2), such as shown in FIG. 9. The waveguide dimensions transverse to the direction of propagation is, in this example, 80×10 mm. It will be appreciated that the locations of the feeding ports in the cavity are not limited to the present examples and that the feeding ports may be located differently in the cavity.

Although the cavity of the present embodiment comprises two separate feeding ports, it will be appreciated that the present invention is not limited to such an embodiment and that a cavity comprising a single feeding port or more than two feeding ports is also within the scope of the present invention.

Preferably, the feeding port for a particular mode is placed at a position corresponding to a maximum value of the field.

Further, in the present example, it is assumed that a defrost load ($\in$=4-j2) covering half the cross-section is located at 10 mm above the floor of the cavity.

The resulting field and heating patterns for the two pre-defined modes in the cavity 950 described with reference to FIG. 9 will now be described.

Figure 10:
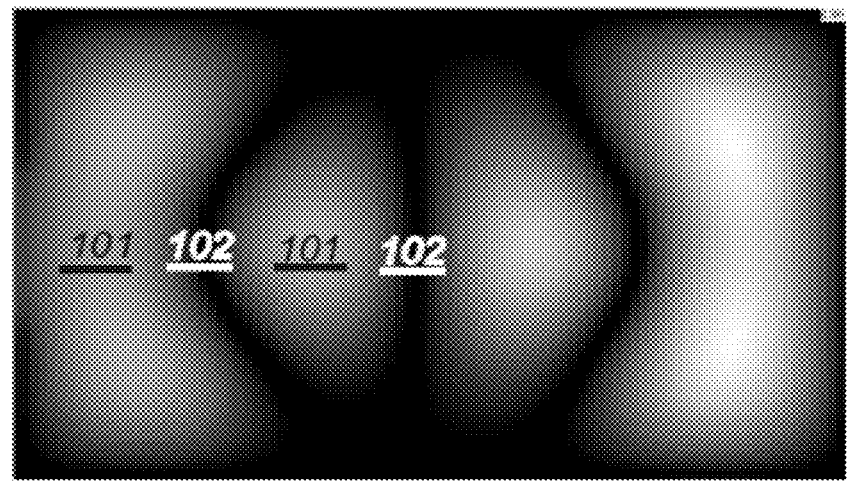
FIG. 10 is a schematic view of a distorted field pattern in a horizontal cross section of the cavity shown in FIG. 9, with a load of permittivity $\in=4-j2$ arranged in the cavity, for the $TM_{411}$ mode.
Figure 11:
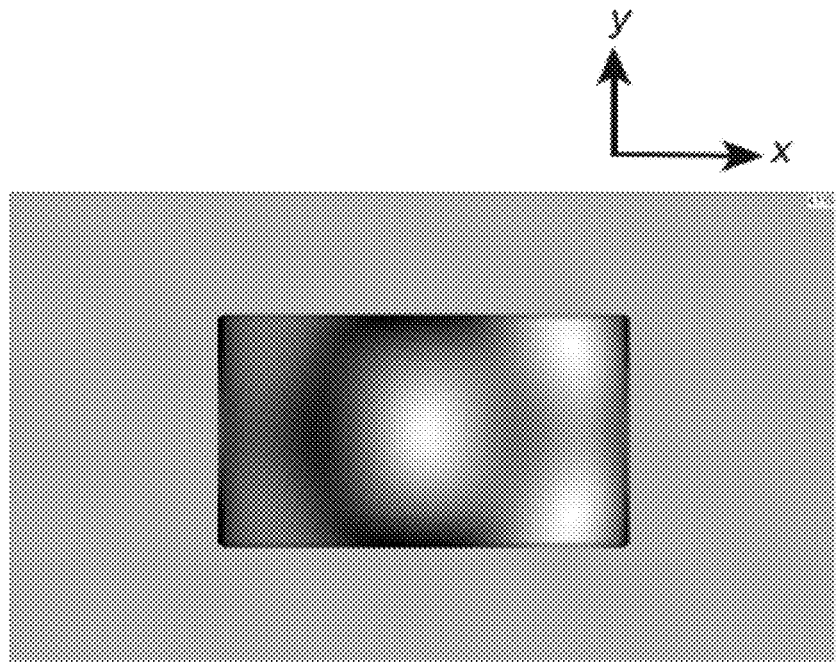
FIG. 11 is a schematic view of the heating pattern at the load upper surface in the cavity mode shown in FIG. 10.

FIG. 10 shows the field pattern (electric field) in a horizontal cross section of the cavity 950 for the $TM_{411}$ mode excited with a frequency of about 2410 MHz. The load arranged in the cavity 950 causes a distortion of the mode pattern on a comparison with the appearance of the mode pattern with an empty cavity (cf. FIGS. 5-8). The figure shows that the mode pattern is somewhat distorted, and, therefore, areas having a large amplitude 101 and areas having, in comparison, a small amplitude 102 seem different from the case where a cavity is empty. Comparison of the field pattern shown in FIG. 10 with the field pattern shown in FIG. 5b clearly illustrates the effect of distortion in the field pattern. FIG. 11 shows the amplitude of the electric field (heating pattern) in a horizontal plane on a level with the upper side or surface of the load ($\in$=4-j2), in this case 10 mm plus load height above the bottom plane of the cavity shown in FIG. 9.

Figure 12:
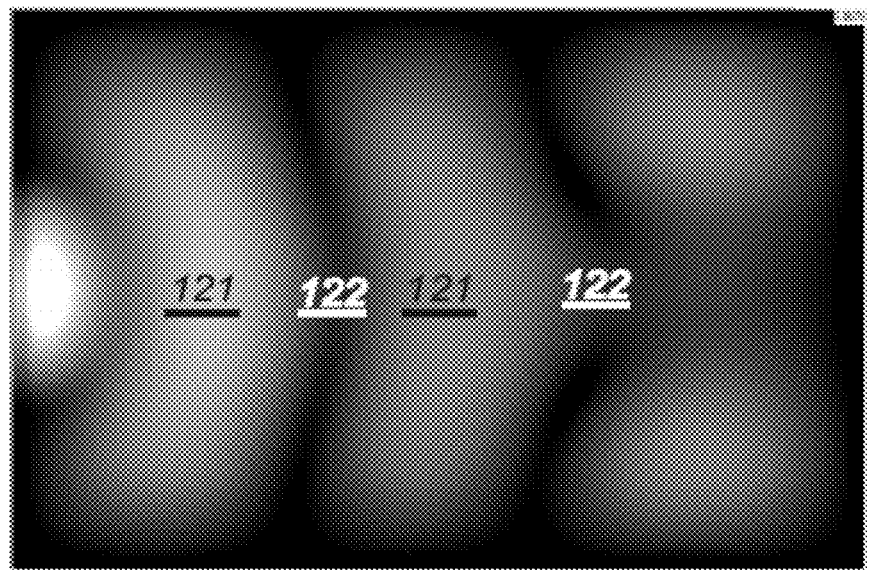
FIG. 12 is a schematic view of a distorted field pattern in a horizontal cross section of the cavity shown in FIG. 9, with a load of permittivity $\in=4-j2$ arranged in the cavity, for the $TM_{312}$ mode.
Figure 13:
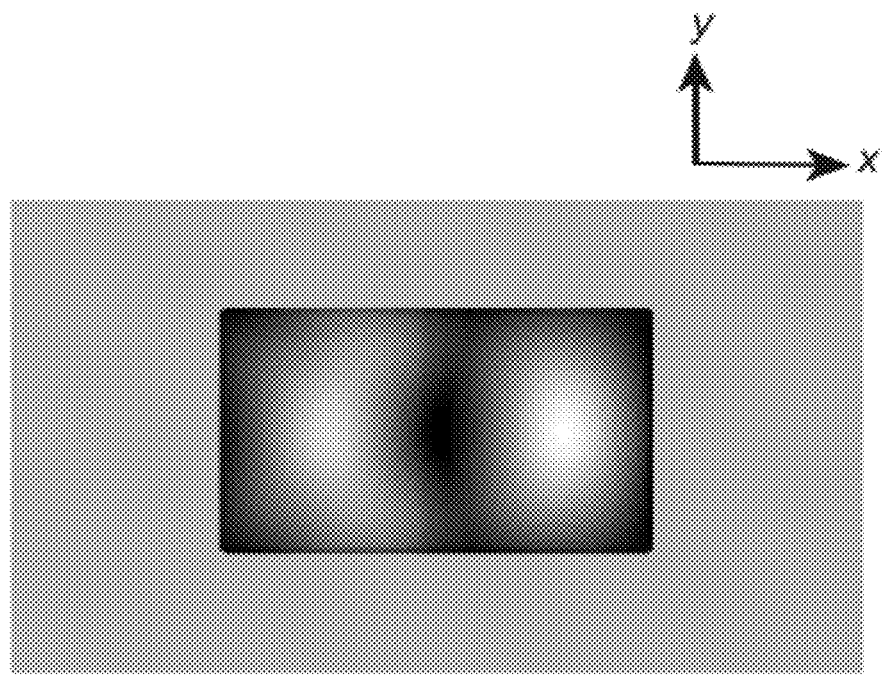
FIG. 13 is a schematic view of the heating pattern at the load upper surface in the cavity mode shown in FIG. 12.

FIG. 12 shows a somewhat distorted field pattern (electric field) in a horizontal cross section of the cavity 950 for the $TM_{312}$ mode excited with a frequency of about 2450 MHz. As for the $TM_{411}$ mode, the load arranged in the cavity 950 causes a distortion of the mode pattern on a comparison with the appearance of the mode pattern with an empty cavity. The field pattern shown in FIG. 12 may be compared with, e.g., the field pattern shown in FIG. 7b to illustrate the effect of distortion in the field pattern. Examples of areas having a large amplitude are denoted by 121 and examples of areas having, in comparison, a small amplitude are denoted by 122. FIG. 13 shows the amplitude of the electric field (heating pattern) in a horizontal plane on a level with the upper side or surface of the load ($\in$=4-j2), in this case 10 mm plus load height above the bottom plane of the cavity shown in FIG. 9.

As can be seen, the heating patterns shown in FIGS. 10 and 12 are relatively complementary. Thus, by switching between the two mode fields or heating patterns shown in FIGS. 10 and 12, i.e. by switching between the frequencies corresponding to these two modes, a "pseudo-rotation" of the field may be obtained in the cavity, thereby resulting in a rather even heating uniformity. It will be appreciated that uniform heating may also require that the matching is rather equal for the two resonances. In the above examples, the matching between the cavity and the very short fictitious waveguides is not considered. The matching is explained in more detail below.

Figure 4A:
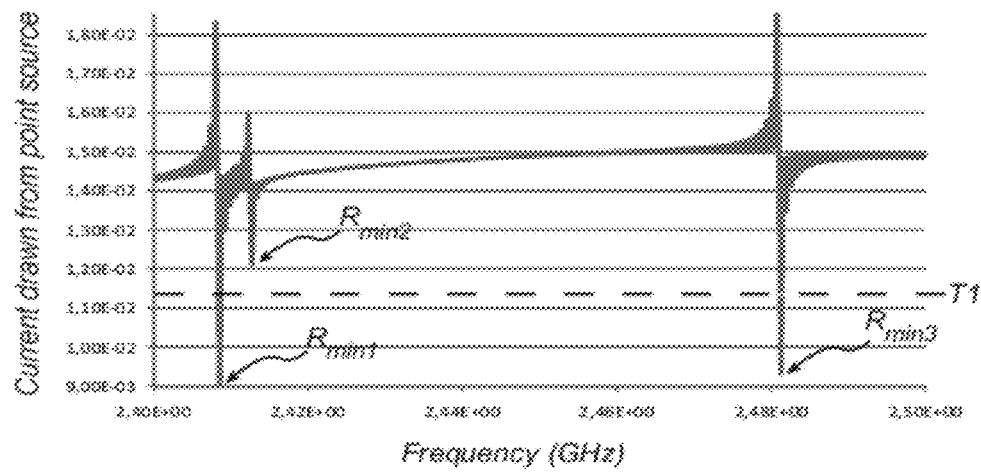
FIG. 4a shows a graph illustrating the current drawn from an ideal point source (fictitious source used during numerical investigation) as a function of frequency. This is a convenient way to investigate theoretical resonant frequencies in a given cavity.
Figure 4B:
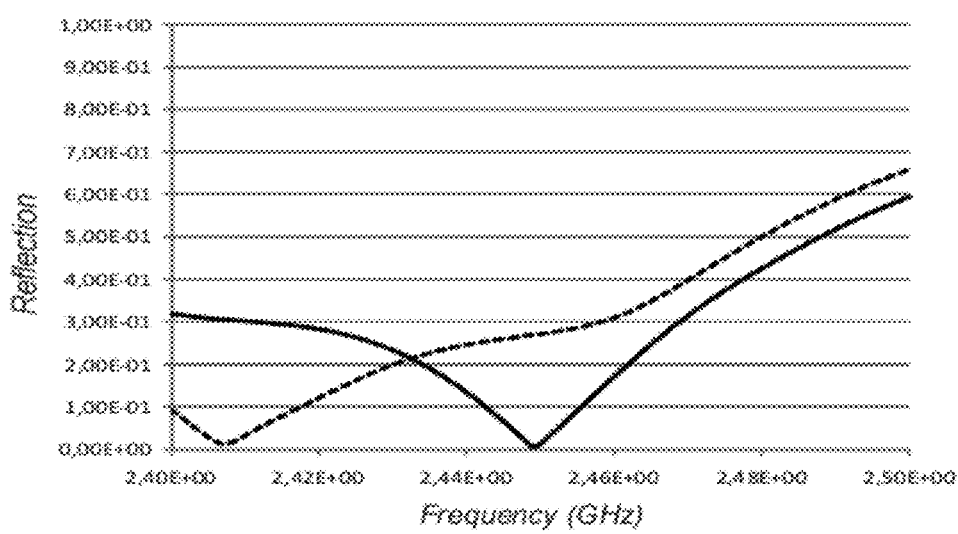
FIG. 4b shows the reflection characteristics for the mode TM411 excited from a ceiling aperture and for the mode TM312 excited from a left wall in a cavity such as shown and described with reference to FIG. 9, with a matching of the feeding waveguides via introduction of a tuning element in each waveguide.

If the two feeding waveguides for the load considered in the example, i.e. a load with $\in$=4-j2 (e.g. a frozen piece of minced meat), are matched, the reflection characteristics become such as that shown in FIG. 4b.

FIG. 4b shows the reflection characteristics for the mode $TM_{411}$ excited from a ceiling aperture 920a (dashed line in FIG. 4b) and for the mode $TM_{312}$ excited from an aperture 920b located at a left wall in the cavity 950 (solid line in FIG. 4b) with a matching of the feeding waveguides obtained via introduction of a tuning element in each waveguide. For the reflection characteristic corresponding to the ceiling aperture 920a, a reflection minimum is identified at about 2410 MHz, which corresponds to the $TM_{411}$ mode. For the reflection characteristic corresponding to the side wall aperture 920b, a reflection minimum is identified at about 2450 MHz, which corresponds to the $TM_{312}$ mode. A tuning element (e.g. a capacitive post) is a protruding item, bulging inwards the waveguide, which locally changes the impedance of the waveguide or transmission line.

As already mentioned above, the load, due to its dielectric properties, will alter the electric size of the cavity. The higher the dielectric constant, the larger the alteration will be. Thus, during design, the feeding system(s) needs to be tuned for a typical intended load, i.e. the effective dielectric properties of e.g. a typical refrigerator chilled food portion. In this process, the theoretical cavity dimensions may also be scaled down slightly according to:

$$x_{res} = x_{theory} \cdot \xi_x(\in) \qquad \text{Equation 5}$$

$$y_{res} = y_{theory} \cdot \xi_y(\in) \qquad \text{Equation 6}$$

$$z_{res} = z_{theory} \cdot \xi_z(\in) \qquad \text{Equation 7}$$

where $0 \leq \xi_x, \xi_y, \xi_z \leq 1$ and $\xi_x, \xi_y$ and $\xi_z$ are function of the dielectric properties of the load. Normally, it is enough to consider the modification of the cavity height alone, i.e. defining $\xi_z$. In the above equations, $\xi_{res}, \xi_{res}$ and $\xi_{res}$ represent the new or downscaled values of the dimensions of the cavity, namely the width, depth and height, respectively (see e.g. FIG. 1), and $x_{theory}, y_{theory}$ and $z_{theory}$ are the theoretically calculated values for the width, depth and height of the cavity.

Figure 14:
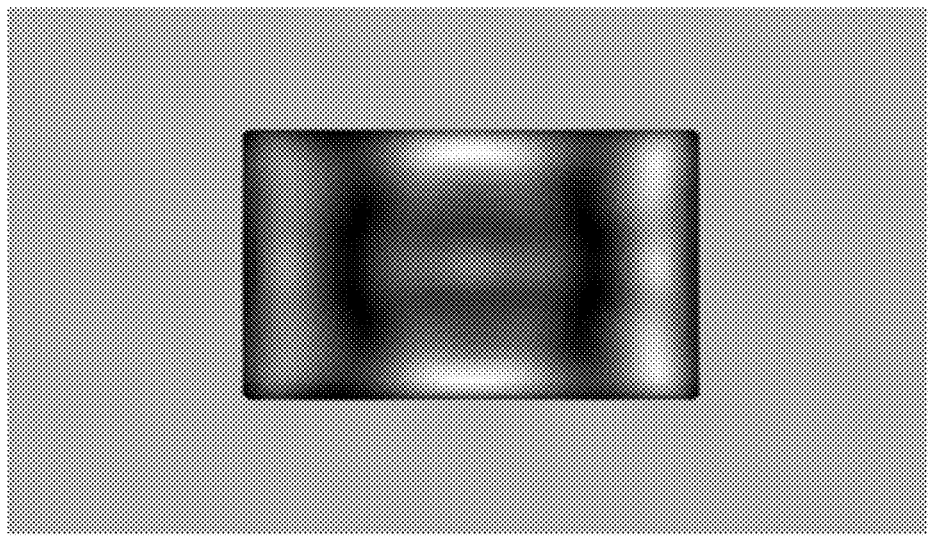
FIG. 14 is a schematic view of a heating pattern in a horizontal plane at a load upper surface obtained from a $TM_{411}$ mode in the cavity shown in FIG. 9 and with dielectric load data $\in=40-j8$.
Figure 15:
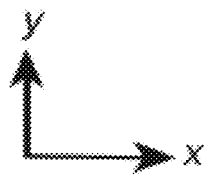
FIG. 15 is a schematic view of a heating pattern at a load upper surface obtained from a $TM_{312}$ mode in the cavity shown in FIG. 9 and with dielectric load data $\in=40-j8$.
Figure 15:
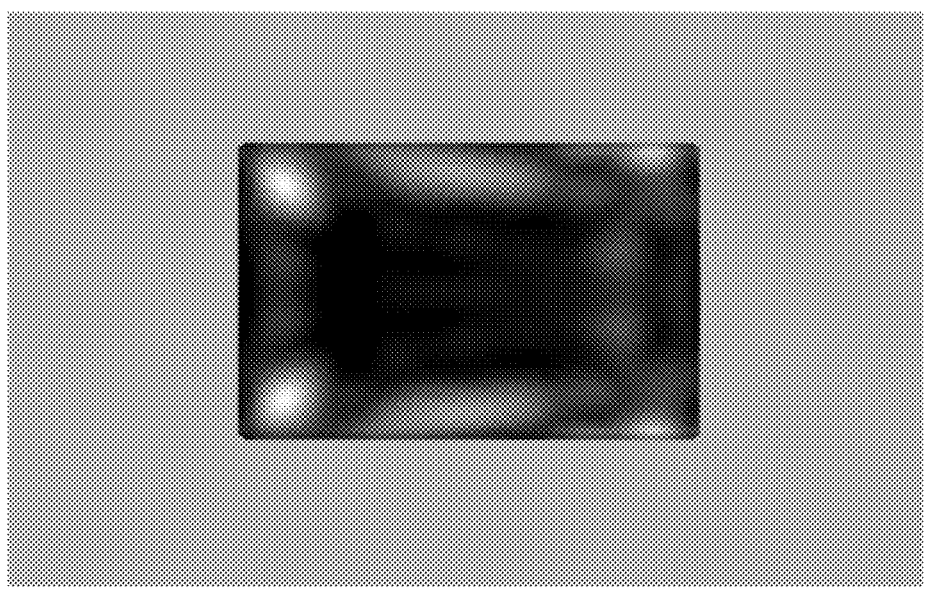

For the purpose of illustrating the effect of a change in the load, FIGS. 14 and 15 show the field patterns for a cavity in which there is arranged a load having a higher permittivity than that described with reference to FIGS. 10-13. In the present example, a load having a permittivity of, e.g., 40-j8, i.e. some typical food for reheat, is arranged in the cavity 950. FIGS. 14 and 15 show, in a horizontal cross section of the cavity, the heating patterns at the load upper surface obtained when excited the cavity with the $TM_{411}$ mode and $TM_{312}$ mode, respectively. A comparison of the field patterns shown in FIGS. 14 and 15 indicates that a complementary heating pattern may also be obtained for a load having dielectric data similar to that of typical reheat food load.

Referring again to FIG. 4a, a change in load (or permittivity of the load) would lead to a shift in frequency of the reflection minima Generally, the permittivity $\in$ of a load is dependent on the nature of the load, e.g. the type of food, and/or the state of the load (liquid instead of solid, or the opposite).

Further, a threshold is advantageously used in order to limit the number of reflection minima to be analyzed by the processor. As illustrated in the graph of point source (fictitious) current as a function of frequency shown in FIG. 4a, a threshold T1 may be used to eliminate or filter away the second reflection minima $R_{min2}$, which does not correspond to one of the predefined modes. In the present example, the processor identifies and processes two reflection minima although there are three in the measured signal.

Generally, referring to the above examples, the preferred mode fields selected during design of a cavity are mode fields resulting in complementary heating patterns, thereby improving uniform heating.

Figure 16:
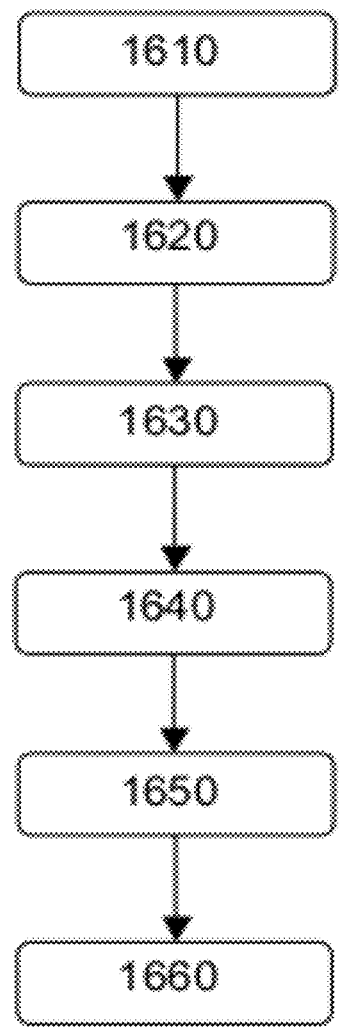
FIG. 16 is a general outline of the method of the present invention.

General steps of the method 1600 according to the present invention are outlined in FIG. 16. The method 1600 is performed in a cavity 150 adapted to receive a load. The cavity is designed to support at least two predefined modes. For each predefined mode, a resonance frequency in the cavity is known. The method therefore comprises a step of providing 1610 a cavity adapted to receive a load. The cavity is adapted to support at least two modes for which a resonance frequency is known, respectively. Further, a frequency-controllable microwave source for feeding microwaves into the cavity via at least one feeding port is provided 1620. The method further comprises the step of measuring 1630 a signal reflected from the cavity as a function of the frequency of the microwaves generated by the microwave source (i.e. the operating frequency of the microwave source). In a step 1640, the resonance frequencies in the cavity are identified based on the measured signal. In step 1650, for the predefined modes, at least two of the identified resonance frequencies are selected based on the known resonance frequencies. Then, in step 1660, the operating frequency of the microwave source is switched using the selected frequencies.

According to an embodiment, the control unit 180 is adapted to regulate the sequence order of the selected frequencies used for switching during an operation cycle. For example, if four frequencies F1, F2, F3 and F4, are selected, it may be preferable, depending on the respective heating patterns or predefined modes associated with these four frequencies, to operate the microwave source 110 in the sequence order (F4, F2, F1, F3) rather than in the sequence order (F1, F2, F3, F4). As the cavity is designed for predefined and well-known modes, the optimal sequence order can easily be determined by the control unit 180.

Further, the control unit 180 may be adapted to regulate the time of operation and/or the output power level at each of the frequencies used for switching. For example, if a graph of the reflection signal versus the frequency shows two reflection minima at two frequencies F1 and F2 with two levels of reflection R1 and R2, respectively, it may be preferable to adjust the time of operation and/or the output power level of the microwave source 110 at F1 and F2 to ensure uniform heating as a function of the ratio between R1 and R2. For example, if R1 is lower than R2, it may be preferable to operate the microwave source 110 at a higher power level and/or for a longer portion of time at the first frequency F1 than at the second frequency F2.

As mentioned above, the optimal parameters (sequence order, time of operation and output power level) may also depend on a predetermined cooking function and/or a predetermined type of load entered by a user.

Advantageously, the storage medium 186 of the control unit 180 is implemented as a look-up table wherein a correspondence is established between the known resonance frequencies and predefined cooking functions and/or between the known resonance frequencies and predefined loads.

The present disclosure is applicable for domestic appliances using microwaves for heating such as a microwave oven. A specific example of application for the present invention is a microwave oven dedicated to warm up a lunch box (load in the range of 350 g), i.e. a microwave oven having a relatively small cavity. The method of the present invention as described above may also be implemented in a computer program that, when executed, performs the inventive method in a microwave oven. The computer program may, for example, be downloaded as an upgrade into a microwave oven already comprising a frequency-controllable microwave source, e.g. a solid-state microwave source.

While specific embodiments have been described, the skilled person will understand that various modifications and alterations are conceivable within the scope as defined in the appended claims.

For example, although a cavity having a rectangular cross-section has been described in the application, it is also envisaged to implement the present invention in a cavity which can be described in any set of orthogonal curvilinear coordinates e.g. cylindrical or spherical coordinates.

The invention claimed is:

1. A microwave oven comprising:
   a cavity adapted to receive a load to be heated, the cavity being designed to support at least two predefined modes, wherein, for each predefined mode, a resonance frequency in the cavity is known;
   a frequency-controllable microwave source connected to the cavity for feeding microwaves to the cavity via at least one feeding port;
   a measuring unit adapted to measure a signal reflected from the cavity as a function of an operating frequency of the microwave source; and
   a control unit connected to the microwave source and adapted to (i) identify resonance frequencies in the cavity based on the measured signal, (ii) select, for the predefined modes, at least two of the identified resonance frequencies based on the known resonance frequencies, and (iii) switch the operating frequency of the microwave source using the selected frequencies.

2. The microwave oven according to claim 1, wherein the control unit is adapted to select, for at least one of the predefined modes, the resonance frequency by comparing the identified resonance frequencies with the known resonance frequency of the predefined mode.

3. The microwave oven according to claim 1, wherein the control unit is adapted to select, for at least one of the predefined modes, the resonance frequency by matching the identified resonance frequencies with a frequency interval representative of the known resonance frequency of the predefined mode.

4. The microwave oven according to claim 1, wherein the identified resonance frequencies are the frequencies corresponding to reflection minima in the measured signal.

5. The microwave oven according to claim 1, wherein the control unit is adapted to identify the resonance frequencies whose reflection minima are below a predetermined value.

6. The microwave oven according to claim 1, wherein the control unit is adapted to select the frequencies for switching based upon at least one of a predetermined cooking function and a predetermined load.

7. The microwave oven according to claim 1, wherein the control unit is adapted to select frequencies resulting in complementary heating patterns.

8. The microwave oven according to claim 1, wherein the cavity has two or more feeding ports arranged to excite complementary modes in the cavity.

9. The microwave oven according to claim 1, further comprising a storage medium for storing at least two of the known resonance frequencies and frequency intervals, wherein the frequency intervals are representative of the known resonance frequencies.

10. The microwave oven according to claim 9, wherein the storage medium is implemented as a look-up table wherein a correspondence is established between the known resonance frequencies and at least one predefined cooking function or between the known resonance frequencies and at least one predefined load.

11. The microwave oven according to claim 9, wherein the control unit is adapted to regulate, during an operation cycle, a sequence order of the selected frequencies used for feeding the cavity.

12. The microwave oven according to claim 9, wherein the control unit is adapted to regulate a time of operation for each of the selected frequencies used for feeding the cavity.

13. The microwave oven according to claim 9, wherein the control unit is adapted to regulate an output power level of the microwave source at each of the selected frequencies used for feeding the cavity.

14. The microwave oven according to claim 9, wherein the microwave source is a solid-state based microwave generator comprising semiconductor elements.

15. A method of heating a load using microwaves, the method comprising the steps of:
   providing a cavity adapted to receive the load, the cavity being designed to support at least two predefined modes, wherein, for each predefined mode, a resonance frequency in the cavity is known;
   providing a frequency-controllable microwave source for feeding the microwaves into the cavity via at least one feeding port;
   measuring a signal reflected from the cavity as a function of an operating frequency of the microwave source;
   identifying resonance frequencies in the cavity based on the measured signal;
   selecting, for the predefined modes, at least two of the identified resonance frequencies; and
   switching the operating frequency of the microwave source using the selected frequencies.

16. A computer program product, loadable into a microwave oven, comprising software code portions for causing a processing means of the microwave oven to perform the steps of measuring, identifying, selecting and switching in accordance with claim 15.

17. A microwave heating compartment comprising:
   a cavity adapted to receive a load to be heated, the cavity being designed to support at least two predefined modes, wherein, for each predefined mode, a resonance frequency in the cavity is known;
   a frequency-controllable microwave source connected to the cavity for feeding microwaves to the cavity via at least one feeding port;
   a measuring unit adapted to measure a signal reflected from the cavity as a function of an operating frequency of the microwave source;
   a control unit connected to the microwave source and adapted to (i) identify resonance frequencies in the cavity based on the measured signal, (ii) select, for the predefined modes, at least two of the identified resonance frequencies based on the known resonance frequencies, and (iii) switch the operating frequency of the microwave source using the selected frequencies; and
   a storage medium for storing at least two of the known resonance frequencies and frequency intervals, wherein the frequency intervals are representative of the known resonance frequencies.

18. The microwave oven according to claim 17, wherein the control unit is adapted to regulate, during an operation cycle, a sequence order of the selected frequencies used for feeding the cavity.

19. The microwave oven according to claim 17, wherein the control unit is adapted to regulate a time of operation for each of the selected frequencies used for feeding the cavity.

20. The microwave oven according to claim 17, wherein the control unit is adapted to regulate an output power level of the microwave source at each of the selected frequencies used for feeding the cavity.

* * * * *